United States Patent
Matusz

(10) Patent No.: US 7,197,311 B2
(45) Date of Patent: Mar. 27, 2007

(54) DATA ROUTING IN A UNIVERSAL MOBILE TELECOMMUNICATION SYSTEM

(75) Inventor: Pawel O. Matusz, Rumia (PL)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 10/602,158

(22) Filed: Jun. 24, 2003

(65) Prior Publication Data

US 2004/0266387 A1  Dec. 30, 2004

(51) Int. Cl.
*H04Q 7/20* (2006.01)
(52) U.S. Cl. ..................................... 455/445
(58) Field of Classification Search ............... 455/445, 455/446, 447, 436–441, 450, 451, 452.1, 455/453, 455, 456.1
See application file for complete search history.

(56) References Cited

U.S. PATENT DOCUMENTS 6,567,667 B1 *   5/2003  Gupta et al. .................. 455/445
6,985,734 B2 *   1/2006  Niska ........................... 455/445
7,123,910 B2 * 10/2006  Lucidarme et al. .......... 455/434
2004/0087308 A1 *  5/2004  Tirkkonen et al. ........... 455/445
2004/0162077 A1 *  8/2004  Kauranen et al. ............ 455/445

* cited by examiner

*Primary Examiner*—Creighton Smith
(74) *Attorney, Agent, or Firm*—Buckley, Maschoff & Talwalkar LLC

(57) ABSTRACT

A data routing methodology where part of the data routing functionality is moved from a core network (CN) to a UTRAN (UMTS Terrestrial Radio Access Network) in a UMTS (Universal Mobile Telecommunication System) system when the communicating source and destination mobile equipments (ME) are residing inside that UMTS system. The separation of user data and signaling flows in such a situation decreases the load of the Iu interface between the UTRAN and the CN, thus decreasing the probability of congestion on this interface and resulting in availability of more Iu bandwidth. The signaling flow is still handled by the CN via the Iu interface, however the data flow is handled by the UTRAN via its internal Iur interface.

20 Claims, 3 Drawing Sheets

DATA ROUTING IN A UNIVERSAL MOBILE TELECOMMUNICATION SYSTEM

BACKGROUND

Today's mobile networks were originally optimized for voice traffic. To carry large amounts of data traffic quickly and cost-effectively, improved radio interfaces—capable of providing higher-bandwidth connections to more users simultaneously—were needed. Hence, optimization of wideband radio technology was conceived for multimedia services and high-speed Internet access.

3G (Third Generation) wireless systems utilize wideband radio technology to provide global mobility with a wide range of services including telephony, paging, messaging, location tracking, and Internet and broadband data transfer. The International Telecommunication Union (ITU) has started the process of defining standards for third generation systems, referred to as International Mobile Telecommunications 2000 (IMT-2000). IMT-2000 includes systems such as CDMA-2000, UWC-136, DECT and UMTS. IMT-2000 ITU Standard Q.1701, Framework for IMT-2000 Networks was published in March of 1999 and may be found at www.itu.int/rec/recomendation.asp. IMT-2000 Supplemental ITU Standard Q.Sup30, Framework for IMT-2000 Networks—Roadmap to IMT-2000 Recommendations, Standards and Technical Specifications was published in December of 2000 and may also be found at www.itu.int/rec/recomendation.asp.

UMTS (Universal Mobile Telecommunications System) is a 3G broadband, packet-based communication of text, digitized voice, video, and multimedia at data rates up to and possibly higher than 2 megabits per second (Mbps), offering a consistent set of services to mobile computer and phone users no matter where they are located in the world. In UMTS, both connection-oriented and connectionless services are offered for Point-to-Point and Point-to-Multipoint communication. It is observed that once UMTS is fully implemented in many parts of the world, computer and phone users will be able to constantly communicate to the Internet as they travel (i.e., as they roam) and the users will have the same set of communication capabilities no matter where they travel. Through UMTS, users can have access through a combination of terrestrial wireless and satellite transmissions. The following data rates may be offered for wireless communication in UMTS: 144 kbps (kilobits per second) for satellite and rural outdoor communication, 384 kbps for urban outdoor communication, and 2048 kbps (2 Mbps) for indoor and low range outdoor communication. Newly defined enhancements to the standard (HSDPA, MIMO) enable data rates up to 10 Mbps or even 20 Mbps.

Today's cellular telephone systems are mainly circuit-switched, with connections always dependent on circuit availability. Circuit switching is a method of communication in which a dedicated communications path is established between two devices through one or more intermediate switching nodes. Packet switching, on the other hand, is a communication method in which packets of data are sent from one device to the other, over a number of communications paths—i.e., without a single, dedicated communications path. In circuit switching, unlike packet switching, digital data are sent as a continuous stream of bits.

BRIEF DESCRIPTION OF THE DRAWINGS

Organization and method of operation, together with objects, features, and advantages of the embodiments of the data routing disclosure given in more detail later in the specification may best be understood by reference to the following detailed description wherein like reference numerals are employed to designate like parts or steps, when read with the accompanying drawings in which.

DETAILED DESCRIPTION

Reference will now be made in detail to the preferred embodiments, examples of which are illustrated in the accompanying drawings. It is to be understood that the figures and descriptions of embodiments included herein illustrate and describe elements that are of particular relevance, while eliminating, for purpose of clarity, other elements found in typical communication networks and telecommunication systems.

Any reference in the specification to "one embodiment," "a certain embodiment," or a similar reference to "an embodiment" is intended to indicate that a particular feature, structure or characteristic is described in connection with the embodiment and is included in at least one embodiment of the present disclosure. The appearances of such terms in various places in the specification are not necessarily all referring to the same embodiment. References to "or" are furthermore intended as inclusive; so "or" may indicate one or the other ored terms or more than one ored terms.

It is noted at the outset that the UMTS architecture discussed herein is that which is standardized or in the process of being standardized under the 3GPP (Third Generation Partnership Project). Therefore, various UMTS domains, network entities, and interfaces discussed herein have globally-accepted technical specifications and meanings with reference to 3G wireless systems and the discussion herein is given with reference to those universal definitions. In view of the present reference to standard terms, concepts and definitions for 3G UMTS architecture, a detailed technical discussion is omitted herein for the sake of clarity. It is also noted that embodiments of UMTS systems, devices, and methods discussed herein may be applied to other domains such as UMTS domains that may be developed in the future.

In UMTS, packet-switching may be implemented using packet-based IP (Internet Protocol), which allows transmission of data over the Internet—a worldwide voice/data communication network. The availability of a packet-switched connection in UMTS means that a virtual connection is almost always available to any other end point in the network. In other words, a user device (e.g., a mobile phone, a laptop computer, a personal digital assistant (PDA), etc.) can be on-line constantly and, at the push of a button, the device can be connected to the UMTS network. Because of this "anytime access" feature, charging may be geared more towards how much information is sent rather than how long the device has been connected to the network. Because of availability of higher bandwidth and IP-based communication, UMTS may allow introduction of new services, such as alternative billing methods (pay-per-bit, pay-per-session, flat rate, asymmetric bandwidth, and others), video conferencing, etc.

Figure 1:
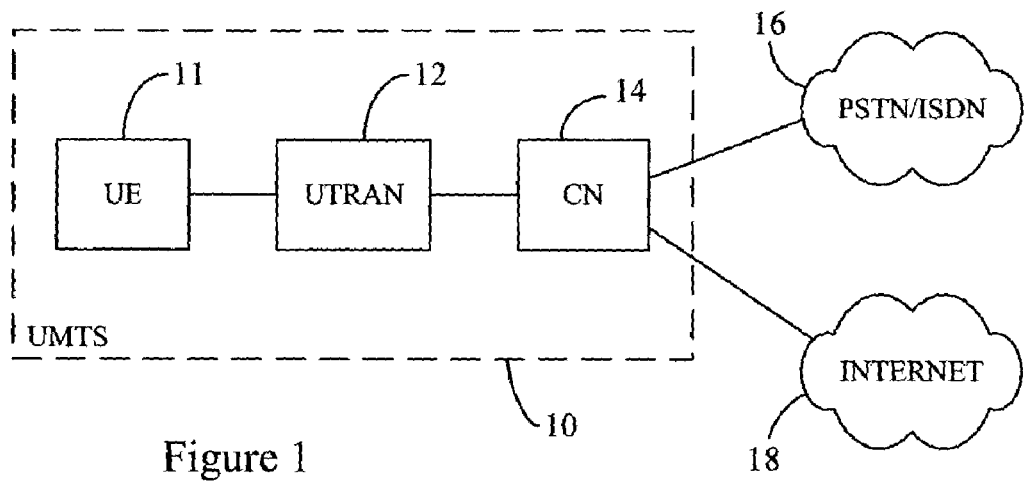
FIG. 1 is a schematic depiction of a UMTS network connected to other existing networks.

FIG. 1 is a schematic depiction of a UMTS network 10 connected to other existing networks. The UMTS network 10 may be considered to consist of three interacting domains: a User Equipment (UE) domain 11, a UMTS Terrestrial Radio Access Network (UTRAN) 12, and a Core Network (CN) 14. The UMTS network 10 may interface with other circuit-switched and packet-switched networks via the core network 14 as is illustrated by the core network's connection to an existing circuit-switched network 16 (e.g., a conventional Public Switched Telephone Network (PSTN) or an Integrated Services Digital Network (ISDN)) and an existing packet-switched network 18 (e.g., the Internet). The arrangement shown in FIG. 1 allows a mobile user in the UMTS system an ability to seamlessly communicate over a number of existing data communication networks. Moreover, each piece of user equipment 20 (as shown in FIGS. 2 and 3) and the access network 12 to which that user equipment couples will be referred to as being part of a common mobile communication switching network.

The user equipment 11 domain may include a number of mobile equipment units (ME) or mobile stations (MS) configured to be operated in a UMTS. The mobile equipment may include, for example, a laptop computer, a PDA, a mobile telephone handset, etc. The UTRAN 12 may handle radio-related functionality and the air interface access method for the UE 11. In other words, the UTRAN 12 may connect the UE 11 to the CN 14 and, hence, to the world of existing circuit-switched and packet-switched data networks. UTRAN 12 may include a number of "base stations" referred to as Node-B's and control equipment for Node-B's called the Radio Network Controllers (RNC's). The main function of the core network 14 is to provide switching, routing and transit functionalities for user voice/data traffic. The core network 14 may also contain the databases (e.g., databases that identify a user as a network customer and maintain information about user's roaming) and perform network management and user management functions (e.g. user location tracing, billing, etc.). The core network 14 may thus be responsible for switching and routing calls and data connections to external networks.

The core network 14 may be divided into circuit switched (CS) and packet switched (PS) domains. Various constituent elements in the core network 14 may be shared by both the circuit-switched and the packet-switched domains, while others may function only for their own respective domains. A UMTS mobile station (MS) or mobile equipment (ME) unit can typically operate in one of three modes of operation: (1) PS/CS mode: Here, the MS is attached to both the PS domain and the CS domain, and the MS is capable of simultaneously operating PS services and CS services. (2) PS mode: Here, the MS is attached to the PS domain only and may only operate services of the PS domain. However, this does not prevent CS-like services to be offered over the PS domain (like VoIP (Voice over IP)). (3) CS mode: The MS is attached to the CS domain only and may only operate services of the CS domain.

Figure 2:
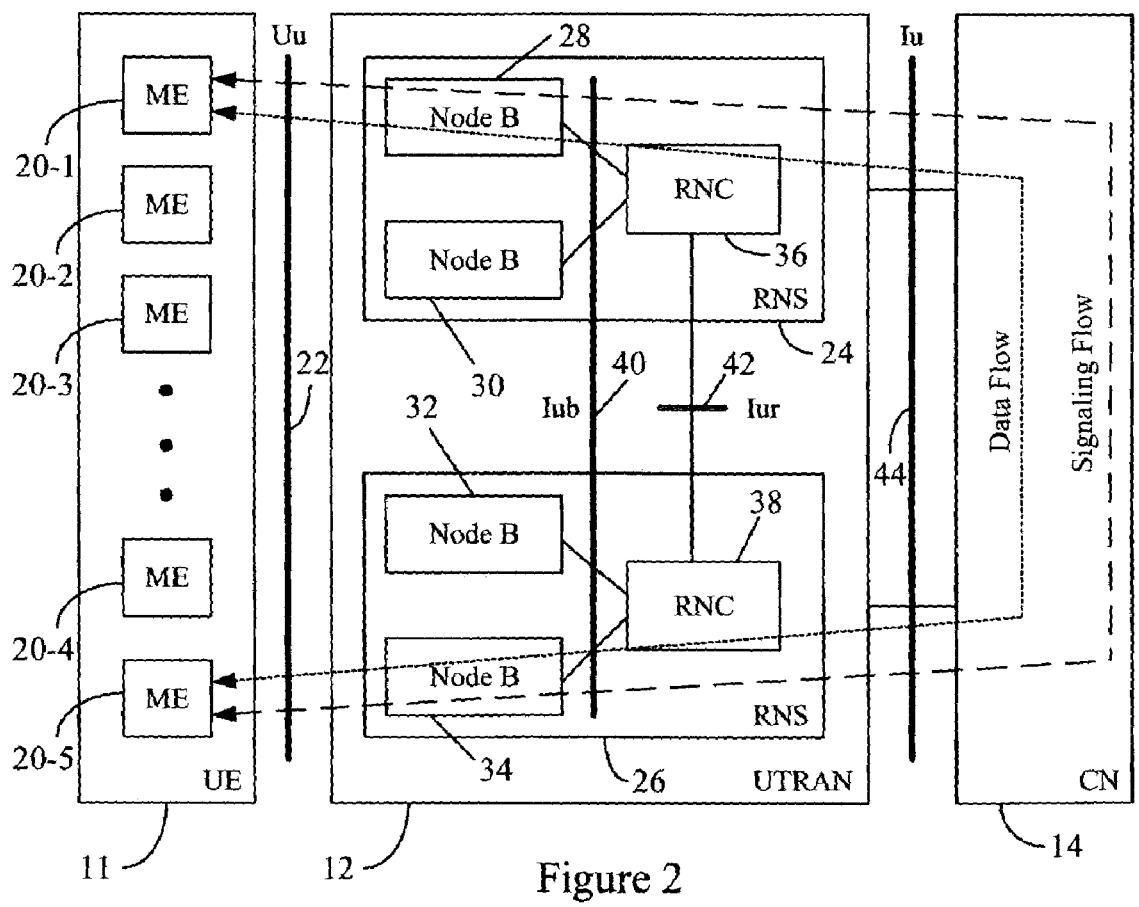
FIG. 2 illustrates a high-level system architecture and messaging flow when two mobile equipments in a UMTS system communicate with each other.
Figure 3:
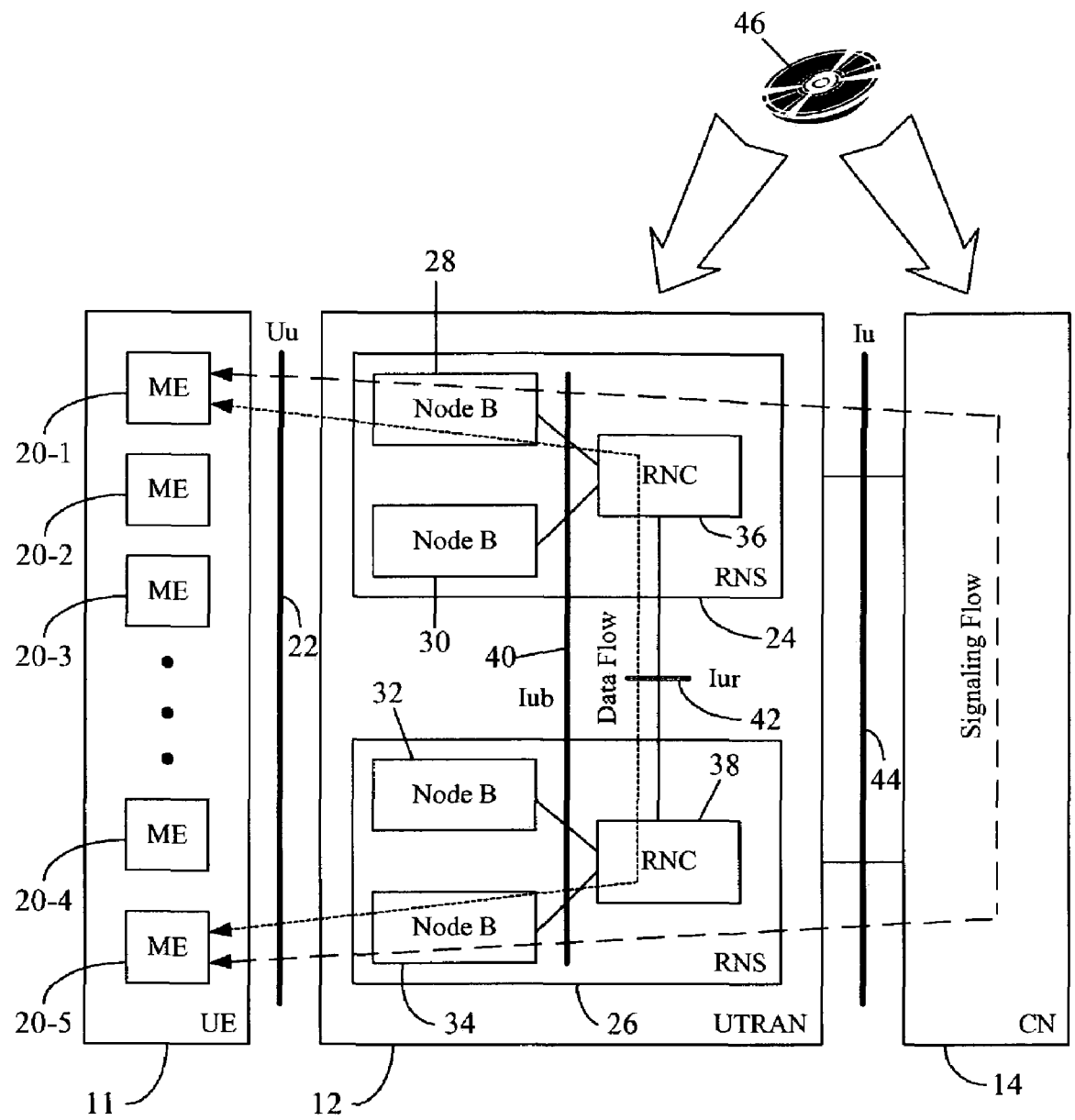
FIG. 3 shows an exemplary data routing according to the present disclosure to decrease the load of an Iu interface in an UMTS system.

FIG. 2 illustrates a high-level system architecture and messaging flow when two mobile equipments in a UMTS system communicate with each other. Components of the UMTS system 10 shown in FIG. 1 are omitted in FIGS. 2 and 3 only for the sake of clarity, but are referred to throughout the discussion hereinbelow, as they may be included in the embodiments of FIGS. 2 and 3. As noted before, the user equipment (UE) domain 11 in a UMTS system may include a number of mobile equipment (ME) units. Some of those ME's are shown numbered 20-1, 20-2 through 20-5 in FIG. 2 and collectively referred to herein by reference numeral "20." In addition to functioning as a voice/data transceiver, an ME 20 may be configured to provide support for such other network functions as user profile storage and communication, security and user authentication during communication, wireless upgrade of service features stored in the ME 20, wireless downloading of new applications into the ME 20, wireless payment of services via ME 20, etc. The UE domain 11 interfaces (or communicates with) the UTRAN 12 via an air interface 22. The interface 22 is referred to in the art as the "Uu interface." In one embodiment, the Uu interface 22 is a radio interface that wirelessly transfers data, voice, and other signals between the UE domain 11 and the UTRAN 12 using a wide band CDMA (Code Division Multiple Access) or WCDMA technology. The WCDMA technology may have two basic modes of operation: the Frequency Division Duplex or FDD mode, and the Time Division Duplex or TDD mode.

In FIG. 2, the UTRAN 12 is shown to contain two radio network subsystems (RNS) 24 and 26. It is noted, however, that there may be more or less than two radio network subsystems in the UTRAN 12 in other embodiments. Furthermore, although each of the RNS 24 and the RNS 26 is shown to connect a different source/destination mobile equipment unit (20-1 and 20-5 respectively in FIG. 2) to the CN 14, in a different embodiment, a single RNS (e.g., the RNS 24) may provide connection services to both the source and the destination mobile equipment units. In FIG. 2, it is assumed that the ME 20-1 is a source mobile equipment unit that wishes to communicate with the destination mobile equipment unit ME 20-5. Each RNS 24 and 26 in the UTRAN 12 may include a number of network elements some of which are shown in FIG. 2. The network elements in the RNS 24 include two Node-B's 28 and 30, and a radio network controller (RNC) 36. Similarly, the network elements in the RNS 26 include two different Node-B's 32, 34, and another RNC 38. It is noted that an RNS may include many other network elements (not shown in FIG. 2), especially more or fewer Node-B's than those shown in FIG. 2.

Each node-B 28-34 provides initial air interface transmission/reception for associated MEs. A node-B may support signal modulation/demodulation, WCDMA channel coding, error handling, signal power control, etc. An RNC 36, 38, on the other hand, may provide radio frequency resource control, radio channel allocation, control over mobile equipment admission into the respective UMTS system, radio channel power control, mobile equipment handover control (e.g., when the mobile equipment is roaming), support for broadcast signaling, segmentation and reassembly of information packets, etc. Each RNC 36, 38 may control one or more node-B's (and, hence, the communication from respective one or more ME's) through an internal, UTRAN interface called "the Iub interface" 40. Two RNC's 36 and 38 in the UTRAN 12 may communicate with each other over another internal, UTRAN interface called "the Iur interface" 42.

Interfaces in UMTS connect functionally separated network elements. The Uu interface 22 is the air, radio interface between MEs 20 in the UE domain 11 and Node Bs 28-34 in the UTRAN domain 12. The Iub interface 40 is defined as an interface between Node Bs and the RNC controlling them. The Iur interface 42 is the interface between RNCs in two separate RNSs. The Iu interface 44 is the interface between RNCs and the CN 14. The Iu interface 44 is further divided into two interfaces: the Iu-PS interface and Iu-CS interface (not shown), connecting RNCs to the packet switched and circuit switched domains of CN 14, accordingly. Data is exchanged through the interfaces using protocols and protocol stacks, which the UMTS standard precisely defines for each interface (e.g. the signaling protocol on the Iu interface is RANAP (Radio Access Network Application Part)). Thus, regardless of the differences in detailed implementation of network elements, they are able to interoperate through the UMTS interfaces using appropriate, standardized protocols.

As discussed hereinbefore, the core network 14 provides the needed switching and routing for an ME 20 in the UMTS system 10 to connect to the existing circuit-switched and packet-switched networks, including the Internet. In one embodiment, the CN 14 may use Asynchronous Transfer Mode (ATM) for communication to other external networks. The ATM Adaptation Layer type-2 (AAL2) may handle circuit-switched connections and the AAL5 may handle packet-switched connections for data delivery. The CN 14 may maintain a number of databases including for example, a subscriber database to identify whether an ME 20 requesting the service belongs to a subscriber of the respective UMTS system 10 and also to authenticate the service transaction, a database for subscription profile identifying, for example, the types of services that have been subscribed by a subscriber, a charging information database to determine how to charge a given service transaction, a database to keep subscriber's physical location information, a database to identify whether the ME 20 requesting the service has been stolen or blacklisted, etc.

The architecture of the core network 14 may change when new services and features are introduced by the service provider or the operator of the UMTS system 10. For example, a Number Portability Database (NPDB). may be used to enable a user to change the network (e.g., when switching to another service provider) while keeping the user's old phone number. In addition to allowing for easy creation and integration of new services, the CN 14 may serve a multitude of different services including, for example, streaming audio and video applications, interactive applications (e.g., online games, online information retrieval, etc.), transactional applications (e.g., database access and updates in billing, financial information, etc.), routine data transfer applications (e.g., FTP file transfers, world wide web browsing, etc.), hosting of third party software applications, etc.

In the 3G UMTS system 10, the communications interface between the UTRAN 12 and the CN 14 is called "the Iu interface" 44. In one embodiment, the Iu interface 44 may be ATM-based and may provide transfer of signaling from UTRAN 12 to CN 14. The Iu interface 44 may also provide hard handover of an ME 20 (e.g., when that ME is roaming and enters into a new UMTS) with switching for that handover being carried out in the respective CN 14. The Iu interface 44 may be divided into two parts: the Iu-PS (packet switched) interface for digital packet-based traffic, and the Iu-CS (circuit switched) interface for circuit-switched, non-packet based traffic.

Traditionally, in the UMTS system 10, when a user, using an ME 20 (e.g., the ME 20-1), wants to place a call or exchange data (using IP packets, for example) with a remote entity, two connections are established: one between UE 11 and CN 14 passing through UTRAN 12, and the other between the CN 14 and the remote entity, which may be located outside of the UMTS system 10 (e.g., an Internet host (not shown in FIG. 2)) or may be another ME 20 inside the system 10 (e.g., the ME 20-5 shown in FIG. 2). In both cases all data exchanged between the user's ME 20-1 and the remote entity (here, the ME 20-5 in FIG. 2) pass through the CN 14, which may perform all switching and routing as well as some other functions discussed hereinbefore (e.g., ME location tracing, billing, etc.). FIG. 2 illustrates such data and signaling flow through the CN 14.

In the discussion given herein, the term "data" is used to refer to the data portion of the communication between two ME's 20 or between an ME 20 and a remote entity, as opposed to the non-data portion of such communication that includes all information not covered by the term "data" and may include information related to signaling, routing, switching, billing, etc. The non-data portion thus may include all information and signaling that are associated with facilitation of a "data" transfer. That non-data portion is collectively referred to herein as the "signaling information" or "signaling flow," while the data portion of the communication is collectively referred to herein as the "data flow".

As can be seen from the illustration in FIG. 2 and from the discussion given hereinabove, one method of data communication in the UMTS 10 may place a significant load on the Iu interface 44. For example, in the case of IP packets exchanged between two ME's (e.g., ME's 20-1 and 20-5 in FIG. 2) residing inside the same UMTS system 10, any data sent between those two ME's would go through the Iu interface 44 two times—from an RNC 36 to a CN 14 and then back and possibly (but not necessarily) through another RNS 38 (e.g., as illustrated in FIG. 2). Such loading of the Iu interface 44 may increase the probability of data traffic congestion on this interface, reduce the available Iu bandwidth (thereby reducing the number of active users (ME's) in the system), and increase user data transfer time because of increased volume of data handled by the Iu interface 44.

FIG. 3 shows an exemplary data routing system that decreases the load of the Iu interface 44 in the UMTS system 10. In that data routing system, part of the routing functionality may be moved from CN 14 to UTRAN 12, thus significantly decreasing the load of the Iu interface 44. As can be seen from the embodiment in FIG. 3, a large portion of the data exchanged between two ME's (ME 20-1 and ME 20-5 in FIG. 3) inside the same UMTS system 10 may be routed by UTRAN 12 through its internal Iur interface 42 instead of unnecessarily passing the data flow through the Iu interface 44.

Figure 4:
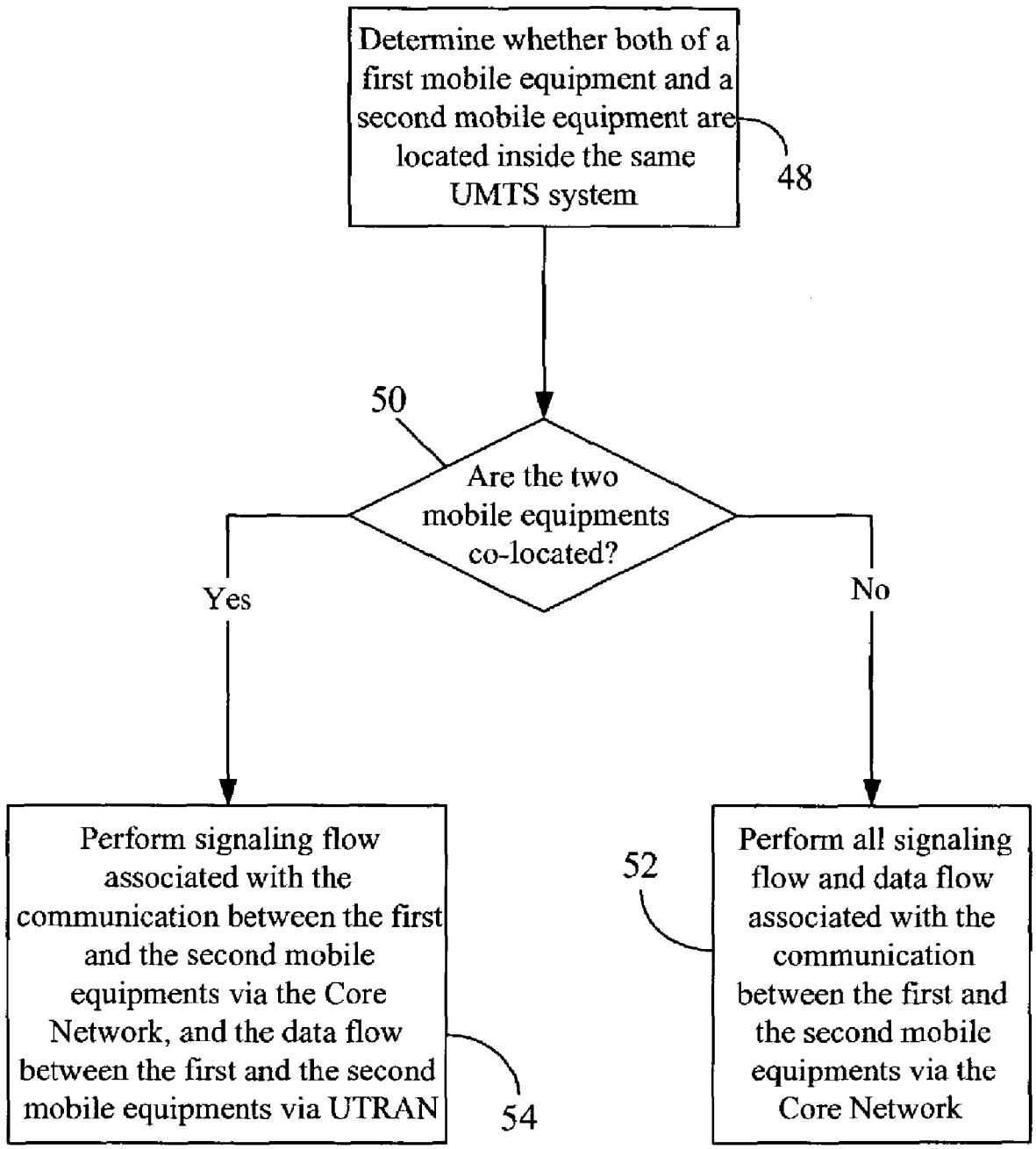
FIG. 4 is a simplified flowchart depicting how data routing is performed according to one embodiment of the present data routing methodology.

The separation of data and signal flows shown in FIG. 3 is discussed hereinbelow with reference to both FIGS. 3 and 4, wherein FIG. 4 is a simplified flowchart depicting how data routing is performed according to one embodiment of the present data routing methodology. Initially, when an ME (e.g., the "source" ME 20-1 in FIG. 3) requests the CN 14 to establish a connection to a remote IP digital address (belonging to a "destination" ME or remote entity), appropriate network elements (not shown) in the CN 14 may use the IP address and an appropriate database in the CN 14 to check if the host or remote entity having the requested IP address is located inside or outside of the current UMTS system 10 (block 48, FIG. 4). The term "location information" includes an IP address or other information that leads to discovery of the location of a device.

It is noted that two network entities (e.g., two ME's) may be considered "co-located", "localized" or located "inside" a UMTS system when both of those entities are physically located within the geographical area of that UMTS system and also served by that UMTS system. On the other hand, a network entity may be located "outside" of a UMTS system when that network entity is not physically located within the geographical area served by the UMTS system or not served by that UMTS system. An Internet server or a GPRS (General Packet Radio System) terminal belonging to another 2G system may be considered as an entity located "outside" of a UMTS system.

If the destination ME or remote entity (e.g., an Internet host) is located outside the source ME's 20-1 UMTS system, the connection establishment and further data flow are performed as defined by the UMTS standard (i.e., as shown and discussed hereinbefore with reference to FIG. 2) (blocks 50 and 52, FIG. 4). However, if the CN 14 determines that the destination IP address supplied by the source ME (e.g., ME 20-1 in FIG. 3) belongs to another ME inside the source ME's UMTS system (e.g., the destination ME 20-5 in FIG. 3), then appropriate network elements (not shown) in the CN may pass information about the localization of the destination ME to the source RNC (e.g., the RNC 36 in FIG. 3) using signaling protocols defined by the UMTS standard, for example RANAP (Radio Access Network Application Protocol). The source RNC 36, in turn, may establish a connection with the source ME 20-1 and use RNSAP (Radio Network Subsystem Application Protocol) to establish a connection with the destination RNC (e.g., the RNC 38 in FIG. 3) over the Iur interface 42, thereby effectively controlling the destination ME 20-5.

Thus, as can be seen from FIG. 3, once source and destination RNC's in a UMTS system are connected as discussed hereinbefore, the user data between the source and destination ME's may pass directly between the RNC's involved through the corresponding Iur interface. The user data and signaling flows are separated and pass through different interfaces. The CN 14, in such a case, may perform only connection supervisory functions and handle all signaling data or signaling flow (e.g., connection termination request). The signaling flow may pass through the CN 14 where the CN 14 handles user billing, connection establishment, etc. The determination of co-location of two mobile equipments and the corresponding separation of data and signaling flows are illustrated by blocks 50 and 54 in FIG. 4. It is noted that a change of the RNC controlling either the source or the destination ME (e.g., due to mobility of the user operating the corresponding ME) may be handled by standard RNSAP procedures. However, in case of physical relocation of an RNC, RNSAP may additionally change the connection between the source and destination RNC's.

It is noted that the data routing discussed hereinabove with reference to FIGS. 3 and 4 may require some changes in the RANAP and RNSAP protocols in the UMTS system 10, to allow for routing support for UTRAN 12 based on the routing information obtained from the CN 14 and setting up of direct connections between appropriate RNC's in the UTRAN 12. It is observed that to effectuate the data routing, appropriate RNC's should be capable of routing data between respective ME's through the direct connections setup between them. Furthermore, functionalities of some CN elements (not shown) may have to be changed in minor ways to provide support (e.g., correct or accurate billing even when the user data does not pass through the CN 14) to support the data routing methodology discussed hereinabove.

In one embodiment, the data routing methodology of FIGS. 3 and 4 may be implemented by modifying functionalities of appropriate elements (not shown) in UTRAN 12 and CN 14 through software. The software or program code may be stored on an external data storage medium and may then be loaded into the memory of appropriate elements. in UTRAN 12 and CN 14. The software, upon execution by the processor(s) in UTRAN 12 and CN 14, may appropriately configure corresponding elements in UTRAN 12 and CN 14 to allow them to perform the data routing discussed hereinbefore with reference to FIGS. 3 and 4. The execution of such software may be ongoing during run-time or may be completed prior to run-time. An exemplary external data storage medium 46 is shown in FIG. 3. Although the external data storage medium 46 is shown as a compact disc (CD) ROM (read only memory), it is observed that any other type of data storage medium (e.g., a high-density magnetic storage medium such as a floppy disk or a data cartridge) or even more than one data storage medium may be used to fully store the software. The software may be written in C, C++, or in any other compiled or interpreted language suitably selected and may be designed using standard software tools including, for example, compilers, linkers, assemblers, loaders, bug tracking systems, memory debugging systems, etc.

The foregoing describes a data routing methodology where part of the data routing functionality is moved from a core network (CN) to a UTRAN in a UMTS system especially when the communicating source and destination mobile equipments are residing inside that UMTS system. The separation of user data and signaling flows in such a situation decreases the load of the Iu interface between the. UTRAN and the CN, thus decreasing the probability of congestion on this interface. Furthermore, reduction in load on the Iu interface enables the system to accommodate more active users (ME's) due to availability of more Iu bandwidth. Additionally, the user data transfer time may be decreased because of less data handling across the Iu interface (avoidance of data handling in the CN).

While the system, apparatus, and method of data routing in a Universal Mobile Telecommunication System (UMTS) have been described in detail and with reference to specific embodiments thereof, it will be apparent to one skilled in the art that various changes and modifications can be made therein without departing from the spirit and scope thereof. Thus, it is intended that the present data routing scheme cover those modifications and variations provided they come within the scope of the appended claims and their equivalents.

What is claimed is:

1. A method comprising:
    ascertaining that a first mobile equipment unit and a second mobile equipment unit are coupled to a common mobile communication switching network having a controller and coupled to a core network; and
    transferring data between said first and said second mobile equipment units via the controller without transferring said data through the core network.

2. The method of claim 1, wherein ascertaining that a first mobile equipment unit and a second mobile equipment unit are coupled to a common mobile communication switching network includes:
    receiving a digital address of said second mobile equipment unit from said first mobile equipment unit; and
    using said digital address to check whether said second mobile equipment unit associated with said digital address is located inside said common mobile communication switching network.

3. The method of claim 1, further comprising allowing said switching network to send information about the locations of said first and said second mobile equipment units to said core network so as to enable said core network to initiate said data transfer.

4. The method of claim 3, wherein allowing said switching network to send location information to said core network includes said switching network informing a first network controller in said core network that said second mobile equipment unit is coupled to said common mobile communication switching network, wherein said first network controller is configured to control electrical communication to and from said first mobile equipment unit.

5. The method of claim 4, further comprising said first network controller establishing a connection with a second network controller in said core network to facilitate said data transfer between said first and said second mobile equipment units, wherein said second network controller is configured to control electrical communication to and from said second mobile equipment unit.

6. The method of claim 1, further comprising allowing said core network to transfer non-data signaling information between any of said first and said second mobile equipment units and said switching network via said second interface without transferring said non-data signaling information via said first interface.

7. A mobile communication system comprising:
a switching network configured to determine whether a first mobile equipment unit and a second mobile equipment unit are coupled to said mobile communication system and to generate an indication when said first and said second mobile equipment units are coupled to said mobile communication system; and
a core network configured to receive said indication from said switching network and to responsively transfer data between said first and said second mobile equipment units via a first interface without transferring said data via a second interface, wherein said core network is configured to connect said first and said second mobile equipment units to said switching network and wherein said first interface is present only inside said core network, and wherein said second interface is present between said core network and said switching network.

8. The mobile communication system of claim 7, wherein said switching network is configured to perform the following to determine whether said first and said second mobile equipments are co-located:
receive a digital address of said second mobile equipment unit from said first mobile equipment unit; and
use said digital address to check whether said second mobile equipment unit associated with said digital address is coupled to said mobile communication system.

9. The mobile communication system of claim 7, wherein said indication includes information about said first and said second mobile equipment units coupling to said mobile communication system so as to enable said core network to initiate said data transfer.

10. The mobile communication system of claim 9, further comprising:
a first network controller in said core network configured to control electrical communication to and from said first mobile equipment unit,
wherein said first network controller is configured to receive said information from said switching network to which said second mobile equipment unit is coupled.

11. The mobile communication system of claim 10, further comprising:
a second network controller in said core network configured to control electrical communication to and from said second mobile equipment,
wherein said first network controller is configured to establish a connection with said second network controller to facilitate said data transfer between said first and said second mobile equipment units.

12. The mobile communication system of claim 7, wherein said core network is further configured to transfer non-data signaling information between any of said first and said second mobile equipment units and said switching network via said second interface without transferring said non-data signaling information via said first interface.

13. A switching network for a mobile communication system, configured to:
determine whether a first mobile equipment unit and a second mobile equipment unit are located inside said mobile communication system; and
instruct an access network configured to connect said first and said second mobile equipment units to said switching network in said mobile communication system to transfer data between said first and said second mobile equipment units via a first interface coupled to said access network without transferring said data via a second interface coupled between said access network and said switching network when said first and said second mobile equipment units are co-located in said switching network.

14. The switching network of claim 13, wherein said switching network is configured to perform the following to determine co-location of said first and said second mobile equipment units:
receive a digital address of said second mobile equipment unit from said first mobile equipment unit; and
use said digital address to check whether said second mobile equipment unit associated with said digital address is located inside said mobile communication system.

15. An access network for a mobile communication system, configured to connect a first mobile equipment unit and a second mobile equipment unit in said mobile communication system to a switching network, said access network configured to:
transfer data between said first and said second mobile equipment units via a first interface present only inside said access network, without transferring said data via a second interface present between said access network and said switching network; and
further transfer non-data signaling information between any of said first and said second mobile equipment units and said switching network via said second interface without transferring said non-data signaling information via said first interface.

16. The access network of claim 15, wherein said access network is further configured to:
receive an indication from said switching network that said first and said second mobile equipment units are located inside said mobile communication system; and
initiate said transfer of data between said first and said second mobile equipment units after receiving said indication from said switching network.

17. A computer readable data storage medium having stored thereon computer executed instructions which, when executed by one or more processors, cause said one or more processors to collectively perform the following:
configure a switching network in a mobile communication system to ascertain that both of a first mobile equipment unit and a second mobile equipment unit are located inside said mobile communication system; and
further configure an access network in said mobile communication system and coupled to said first and said second mobile equipment units and to said switching network to transfer data between said first and said second mobile equipment units via a first interface present only inside said access network without transferring said data via a second interface present between said access network and said switching network after co-location of said first and said second mobile equipment units is ascertained by said switching network.

18. The data storage medium of claim 17, wherein said instructions, upon execution, further cause said one or more processors to collectively perform the following:

further configure said switching network to inform a first network controller in said access network that said second mobile equipment unit is located inside said mobile communication system, said first network controller being configured to control electrical communication to and from said first mobile equipment unit.

19. The data storage medium of claim 18, wherein said instructions, upon execution, further cause said one or more processors to collectively perform the following:

configure said first network controller to establish a connection with a second network controller in said access network to facilitate said data transfer between said first and said second mobile equipment units, wherein said second network controller is configured to control electrical communication to and from said second mobile equipment unit.

20. The data storage medium of claim 17, wherein said instructions, upon execution, further cause said one or more processors to collectively perform the following:

further configure said access network to transfer non-data signaling information between any of said first and said second mobile equipment units and said switching network via said second interface without transferring said non-data signaling information via said first interface.

* * * * *